United States Patent
Gormley et al.

(10) Patent No.: US 11,346,304 B2
(45) Date of Patent: May 31, 2022

(54) THRUST REVERSER SINGLE DEGREE OF FREEDOM ACTUATOR MECHANISM SYSTEMS AND METHODS

(71) Applicant: ROHR, INC., Chula Vista, CA (US)

(72) Inventors: Timothy Gormley, Bonita, CA (US); Imad D. Ghandour, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 253 days.

(21) Appl. No.: 16/560,673

(22) Filed: Sep. 4, 2019

(65) Prior Publication Data
US 2020/0080514 A1    Mar. 12, 2020

Related U.S. Application Data (60) Provisional application No. 62/728,003, filed on Sep. 6, 2018.

(51) Int. Cl.
F02K 1/76    (2006.01)
F02K 1/60    (2006.01)

(52) U.S. Cl.
CPC .................................. F02K 1/763 (2013.01)

(58) Field of Classification Search
CPC ............. F02K 1/763; F02K 1/60; F02K 1/605
See application file for complete search history.

(56) References Cited

U.S. PATENT DOCUMENTS

| | | | |
|---|---|---|---|
| 3,164,956 A | 1/1965 | Colebrook | |
| 3,532,275 A * | 10/1970 | Hom | F02K 1/60 239/265.33 |
| 3,797,785 A * | 3/1974 | Baerresen | F02K 1/72 244/53 R |
| 3,863,867 A | 2/1975 | Souslin | |
| 4,422,605 A | 12/1983 | Fage | |
| 4,519,561 A | 5/1985 | Timms | |
| 5,392,991 A | 2/1995 | Gatti et al. | |
| 5,730,392 A | 3/1998 | Lair | |
| 6,487,845 B1 | 12/2002 | Modglin et al. | |
| 7,104,500 B1 | 9/2006 | Smith | |
| 7,735,778 B2 | 6/2010 | Lair et al. | |

(Continued)

FOREIGN PATENT DOCUMENTS

| | | |
|---|---|---|
| EP | 0574730 | 12/1993 |
| EP | 1903205 | 3/2008 |

(Continued)

OTHER PUBLICATIONS

European Patent Office, European Search Report dated Jan. 29, 2020 in Application No. 19195975.8.

(Continued)

*Primary Examiner* — Andrew H Nguyen
(74) *Attorney, Agent, or Firm* — Snell & Wilmer L.L.P.

(57) ABSTRACT

A thrust reverser may include a frame, a track disposed on the frame, a carrier operatively coupled to the track, and a first reverser door operatively coupled to the carrier. The first reverser door is movable relative to the frame, wherein the first reverser door is configured to move to a first position in response to the carrier moving with respect to the track in a first direction, and move to a second position in response to the carrier moving with respect to the track in a second direction.

10 Claims, 9 Drawing Sheets

(56) References Cited

U.S. PATENT DOCUMENTS

| | | | |
|---|---|---|---|
| 8,172,175 B2 | 5/2012 | Lair | |
| 8,434,715 B2 | 5/2013 | Lair | |
| 9,970,388 B2 | 5/2018 | Chandler et al. | |
| 2008/0295519 A1* | 12/2008 | Park | F23R 3/28 60/740 |
| 2015/0121839 A1 | 5/2015 | Chandler | |
| 2017/0321632 A1 | 11/2017 | Howarth et al. | |

FOREIGN PATENT DOCUMENTS

| | | |
|---|---|---|
| EP | 2060765 | 5/2009 |
| FR | 3025256 | 3/2016 |

OTHER PUBLICATIONS

European Patent Office, European Search Report dated Feb. 5, 2020 in Application No. 19196050.9.
European Patent Office, European Search Report dated Feb. 5, 2020 in Application No. 19196031.9.
USPTO, Pre-Interview First Office Action dated Aug. 11, 2021 in U.S. Appl. No. 16/560,716.
USPTO, Pre-Interview First Office Action dated Aug. 13, 2021 in U.S. Appl. No. 16/560,866.
USPTO, First Action Interview Office Action dated Sep. 20, 2021 in U.S. Appl. No. 16/560,716.
USPTO, Notice of Allowance dated Dec. 13, 2021 in U.S. Appl. No. 16/560,716.
USPTO, First Action Interview Office Action dated Sep. 20, 2021 in U.S. Appl. No. 16/560,866.

\* cited by examiner

THRUST REVERSER SINGLE DEGREE OF FREEDOM ACTUATOR MECHANISM SYSTEMS AND METHODS

CROSS REFERENCE TO RELATED APPLICATIONS

This application claims priority to, and the benefit of, U.S. Provisional Patent Application Ser. No. 62/728,003, entitled "THRUST REVERSER SINGLE DEGREE OF FREEDOM ACTUATOR MECHANISM," filed on Sep. 6, 2018. The '003 application is hereby incorporated by reference in their entirety for all purposes.

FIELD

The present disclosure relates generally to aircraft thrust reversers used with gas turbine engines and, more particularly, to pivot door thrust reversers.

BACKGROUND

Turbofan gas turbine engines are known to include a fan section that produces a bypass airflow for providing the majority of engine propulsion and a core engine section through which a core airflow is compressed, mixed with fuel, combusted and expanded through a turbine to drive the fan section. In a mixed flow turbofan engine, the cool bypass airflow is ducted between a surrounding nacelle and an outer casing of the core engine section and mixed with a hot exhaust stream from the core engine section prior to discharge from the engine nozzle in a combined or mixed exhaust stream. The surrounding nacelle may include a thrust reverser capable of redirecting the mixed exhaust stream from a rearward direction to, at least partially, a forward direction thus producing a rearward thrust that may serve to decelerate forward motion of an aircraft and thereby assist braking the aircraft upon landing. Pivot door thrust reversers may be used with turbofan gas turbine engines for aircraft, including for corporate or business jets. Pre-exit pivot door thrust reversers may generally be characterized as including thrust reverser doors having trailing edges positioned forward of the exit plane of an exhaust duct, while post-exit pivot door thrust reversers may generally be characterized as including thrust reverser doors having trailing edges that form at least a portion of the exit plane of an exhaust duct.

SUMMARY

An actuation arrangement for a thrust reverser is disclosed, comprising a carrier configured to translate along a track disposed on a frame of the thrust reverser, wherein the carrier is configured to move a reverser door between a stowed position and a deployed position in response to the carrier translating along the track.

In various embodiments, the actuation arrangement further comprises a first link configured to be pivotally coupled to the carrier, wherein the carrier is configured to move the reverser door between the stowed position and the deployed position via the first link.

In various embodiments, the actuation arrangement further comprises a linear actuator configured to be coupled to the frame.

In various embodiments, the carrier is driven by the linear actuator.

In various embodiments, the carrier is configured to react loads that are parallel a line-of-action of the linear actuator from the first link into the linear actuator and configured to react loads that are non-parallel the line-of-action of the linear actuator from the first link into the track.

In various embodiments, the actuation arrangement further comprises a second link configured to be pivotally coupled to the carrier, wherein the carrier is configured to move a second reverser door between a stowed position and a deployed position via the second link.

In various embodiments, the carrier comprises a first track lug and the track comprises a first groove configured to receive the first track lug.

In various embodiments, the carrier comprises a second track lug and the track comprises a second groove configured to receive the second track lug, wherein the first track lug comprises a rectangular geometry and the second track lug comprises a round geometry.

In various embodiments, the first track lug comprises a cutout configured to reduce a surface area of the first track lug in contact with the track.

In various embodiments, the actuation arrangement further comprises a liner disposed in the first groove, wherein the first track lug is configured to contact a wear surface of the liner.

A thrust reverser is disclosed, comprising a frame, a track disposed on the frame, a carrier operatively coupled to the track, and a first reverser door operatively coupled to the carrier, the first reverser door is movable relative to the frame, wherein the first reverser door is configured to move to a first position in response to the carrier moving with respect to the track in a first direction, and move to a second position in response to the carrier moving with respect to the track in a second direction.

In various embodiments, the first reverser door is configured to rotate to the first position in response to the carrier moving linearly with respect to the track in the first direction.

In various embodiments, the thrust reverser further comprises a first link, wherein the carrier is coupled to the first reverser door via the first link.

In various embodiments, a first end of the first link is pivotally coupled to the first reverser door and a second end of the first link is pivotally coupled to the carrier.

In various embodiments, the thrust reverser further comprises a linear actuator coupled to the frame, wherein the linear actuator is configured to move the carrier with respect to the track.

In various embodiments, the thrust reverser further comprises a second reverser door operatively coupled to the carrier.

In various embodiments, the thrust reverser further comprises a second link, wherein the carrier is coupled to the second reverser door via the second link.

In various embodiments, a first end of the second link is pivotally coupled to the second reverser door and a second end of the second link is pivotally coupled to the carrier.

In various embodiments, the thrust reverser further comprises a fairing coupled to the frame and disposed between the first reverser door and the second reverser door, wherein the fairing is disposed outward from the frame with respect to a central axis of the thrust reverser, and the fairing is flush with the first reverser door and the second reverser door in response to the thrust reverser being in a stowed position.

A method for deploying a thrust reverser is disclosed, comprising translating a carrier along a track, transferring a first load between the carrier and a first reverser door in response to the carrier translating along the track, and rotating the first reverser door between a stowed position and a deployed position in response to the carrier translating along the track.

In various embodiments, the method further comprises transferring a second load between the carrier and a second reverser door in response to the carrier translating along the track, and rotating the second reverser door between a stowed position and a deployed position in response to the carrier translating along the track.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

In various embodiments, a thrust reverser, as provided herein, includes an actuation arrangement including a carrier configured to translate along a single, fixed direction with respect to a reverser frame and at least one reverser door configured to move between a stowed position and a deployed position in response to the translation of the carrier with respect to the frame. The carrier may be driven along a track by a linear actuator. The actuation arrangement, as provided herein, may react five degrees of freedom directly into the reverser frame, leaving the linear actuator to react only a single degree of freedom. In this regard, an actuation arrangement as provided herein, may provide for reduced actuator wear.

An actuation arrangement, as provided herein, can be tailored to accommodate any reverser door scheduling/timing desired. For example, one door can open faster than the other, or be delayed over the other, or the two doors can open simultaneously at a similar rate. An actuation arrangement, as provided herein, may reduce overall weight of the thrust reverser. Packing of the actuation arrangement, as provided herein, may be simplified since the actuator is not necessarily "planar" with the pair of links. An actuation arrangement, as provided herein, may be used with a wide variety of door hinge line configurations.

Figure 1:
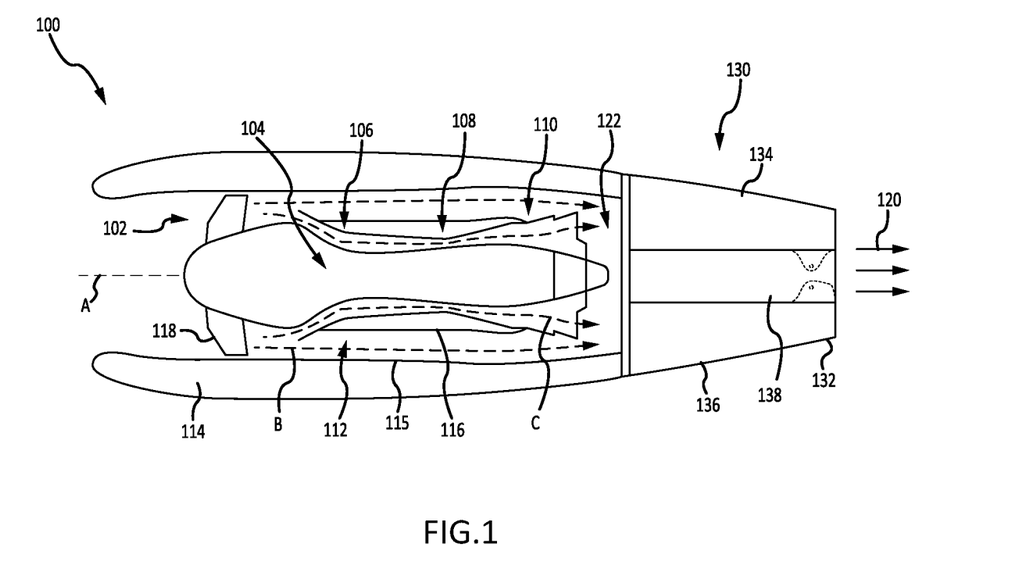
FIG. 1 provides a schematic view of a gas turbine engine, in accordance with various embodiments.

Referring now to the drawings, FIG. 1 schematically illustrates a gas turbine engine 100 of a mixed flow turbofan variety. The gas turbine engine 100 generally includes a fan section 102 and a core engine section 104, which includes a compressor section 106, a combustor section 108 and a turbine section 110. The fan section 102 drives air along a bypass flow path B in a bypass duct 112 defined within a radially inner surface 115 of a nacelle 114 and an outer casing 116 of the core engine section 104, while the compressor section 106 drives air along a core flow path C of the core engine section 104 for compression and communication into the combustor section 108 and then expansion through the turbine section 110.

The core engine section 104 may generally include a low speed spool and a high speed spool mounted for rotation about a central longitudinal axis A. The low speed spool generally includes an inner shaft that interconnects a fan 118 within the fan section 102, a low pressure compressor within the compressor section 106 and a low pressure turbine within the turbine section 110. The inner shaft may be connected to the fan 118 through a speed change mechanism or gear box to drive the fan 118 at a lower rotational speed than the rotational speed of the low speed spool. The high speed spool generally includes an outer shaft that interconnects a high pressure compressor within the compressor section 106 and a high pressure turbine within the turbine section 110. A combustor is arranged in the combustor section 108 between the high pressure compressor and the high pressure turbine. The air passing through the bypass flow path B mixes with the combustion gases exiting the core flow path C in a mixing section 122 positioned downstream of the core engine section 104 prior to discharge as a mixed exhaust stream 120, which provides the thrust achieved by the gas turbine engine 100.

A thrust reverser 130 is mounted to the aft end of the gas turbine engine 100. The thrust reverser 130 includes a generally annular exhaust duct 132, which defines an outer boundary for discharging the mixed exhaust stream 120 when the thrust reverser 130 assumes a stowed position (also referred to as a closed position or a retracted position), as illustrated in FIG. 1. The thrust reverser 130 further includes an upper reverser door 134, a lower reverser door 136 and a pair of opposing fairings 138, which may house actuator componentry and connecting members used to open and close the upper reverser door 134 and the lower reverser door 136. As discussed below, thrust reversal is affected by opening the upper reverser door 134 and the lower reverser door 136 to direct all or a portion of the mixed exhaust stream 120 in a direction having an upstream component relative to the central longitudinal axis A of the gas turbine engine 100. The momentum of the upstream component of the mixed exhaust stream 120 exiting the thrust reverser 130 while in an open or deployed position provides the reverse thrust used to decelerate an aircraft upon landing or during a rejected takeoff.

Figure 2A:
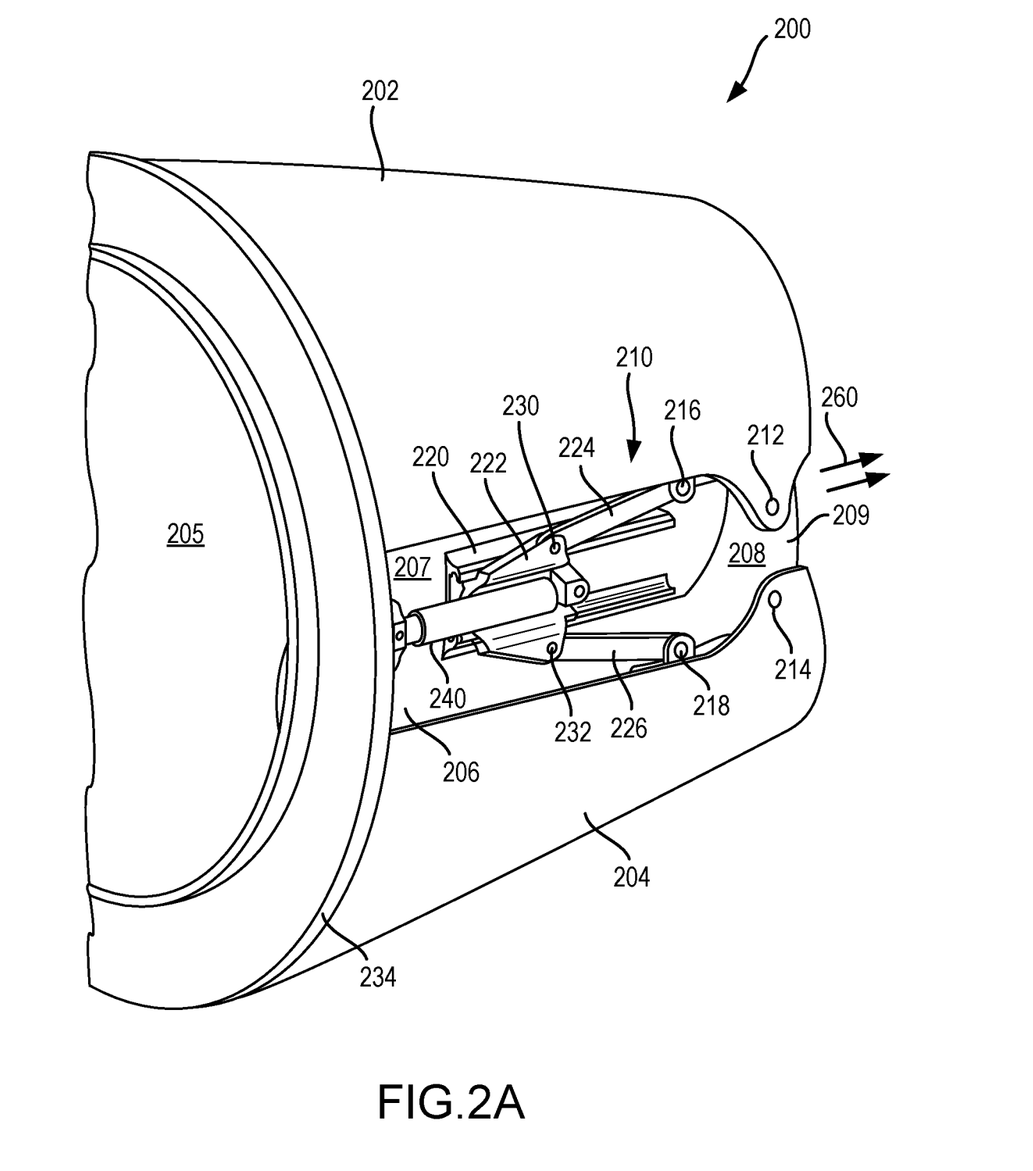
FIG. 2A and FIG. 2B provide an isometric view and a side view, respectively, of a thrust reverser in a stowed position and having a single degree of freedom actuation system, in accordance with various embodiments.
Figure 2B:
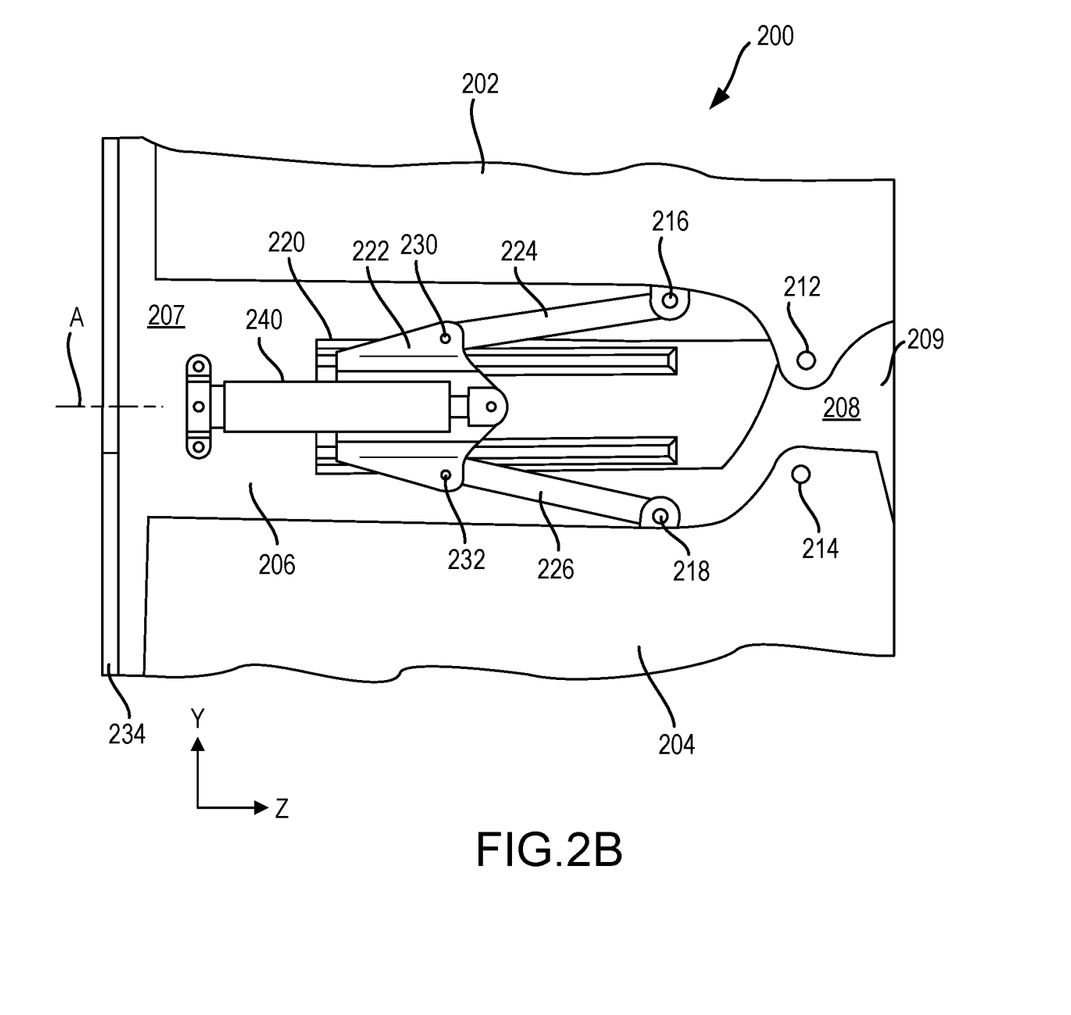

Referring now to FIG. 2A and FIG. 2B, a perspective view and a side view, respectively, of a thrust reverser 200 in a stowed position are illustrated, in accordance with various embodiments. The thrust reverser 200 includes an upper reverser door 202, a lower reverser door 204, and a frame 206. In various embodiments, the frame 206 includes an annular structure 207 with a pair of opposing side beams 208 extending from the annular structure 207. The pair of opposing side beams 208 may include a port side beam 209 and a starboard side beam. The pair of opposing side beams 208 may provide a structural support for mounting related components and operating the thrust reverser 200 between deployed and retracted positions. Upper reverser door 202 is moveable relative to frame 206. Lower reverser door 204 is moveable relative to frame 206.

In various embodiments, upper reverser door 202 is rotatably coupled to frame 206 via a hinge 212 (also referred to herein as a first hinge). In various embodiments, lower reverser door 204 is rotatably coupled to frame 206 via a hinge 214 (also referred to herein as a second hinge). It is contemplated herein that hinge 212 and hinge 214 may comprise two distinct hinges, or may comprise a common hinge, depending on the thrust reverser design.

In various embodiments, an actuation arrangement 210 (also referred to herein as a single degree of freedom actuation arrangement) is mounted to the port side beam 209. A fairing (e.g., see fairing 138 of FIG. 1) is removed in FIG. 2A through FIG. 3B in order to clearly show actuation arrangement 210. However, said fairing may be included to provide an aerodynamic surface extending between, and generally flush with upper reverser door 202 and lower reverser door 204. In various embodiments, a second actuation arrangement is mounted to the starboard side beam. The second actuation arrangement may be similar to actuation arrangement 210 and the two actuation arrangements may be generally symmetric about central axis A. Stated differently, the starboard side actuation arrangement and side beam configuration may be symmetrical with the port side actuation arrangement and side beam configuration described herein. In this regard, although described herein with respect to the port side, it should be understood that the starboard side may comprise a similar arrangement as the port side.

In various embodiments, actuation arrangement 210 may include one or more components mounted to port side beam 209. Actuation arrangement 210 is configured to facilitate rotation of the upper reverser door 202 and the lower reverser door 204 between open or deployed and closed or stowed states within the thrust reverser 200. Actuation arrangement 210 comprises a track 220 and a carrier 222 operatively coupled to the track. The carrier 222 may be configured to translate along the track 220. Carrier 222 may be moveable between a first position (see FIG. 2A) corresponding to a closed position of the thrust reverser doors, and a second position (see FIG. 3A) corresponding to an open position of the thrust reverser doors. Actuation arrangement 210 may further comprise a first link 224 and a second link 226. First link 224 may be pivotally coupled to carrier 222 at a first end thereof via a hinge 230 and pivotally coupled to upper reverser door 202 at a second end thereof via a hinge 216. Second link 226 may be pivotally coupled to carrier 222 at a first end thereof via a hinge 232 and pivotally coupled to lower reverser door 204 at a second end thereof via a hinge 218.

Figure 3A:
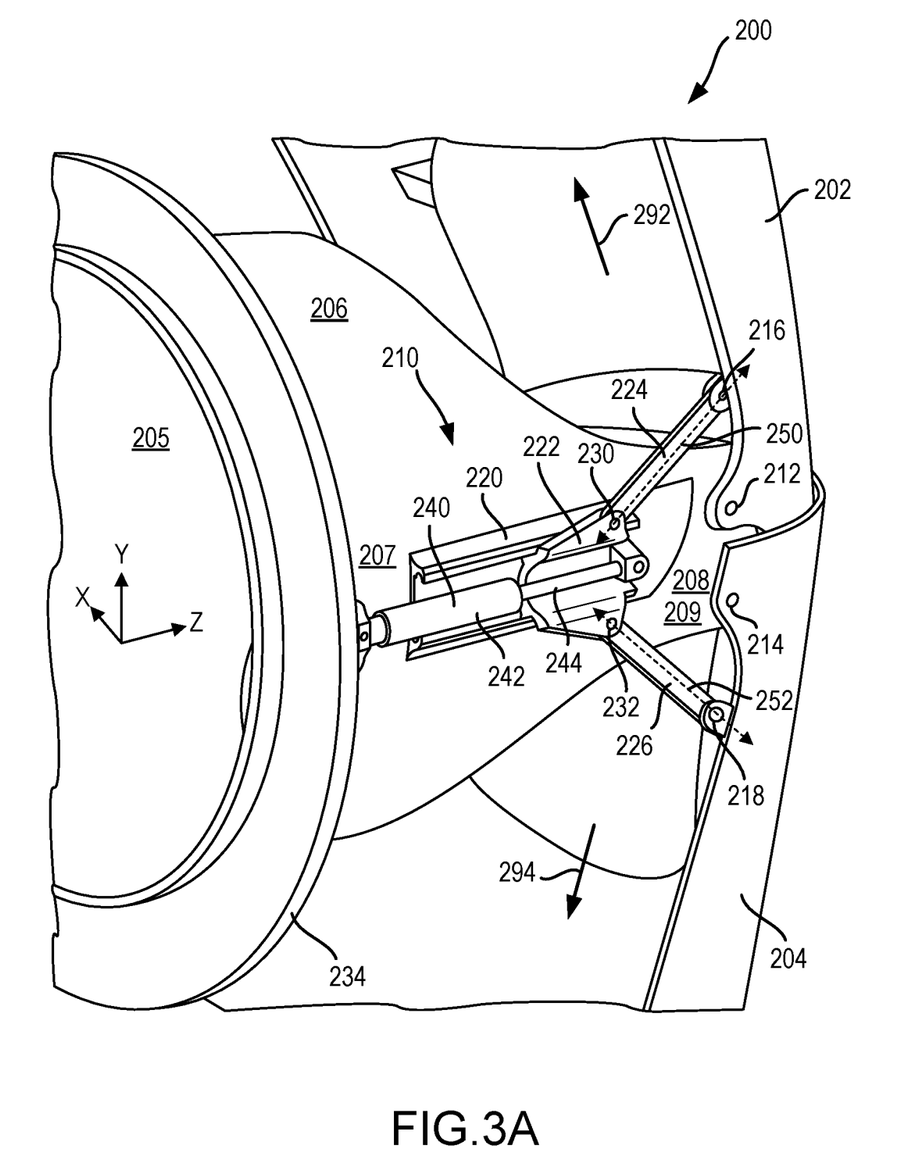
FIG. 3A and FIG. 3B provide an isometric view and a side view, respectively, of the thrust reverser of FIG. 2A and FIG. 2B in a deployed position and having the single degree of freedom actuation system, in accordance with various embodiments.
Figure 3B:
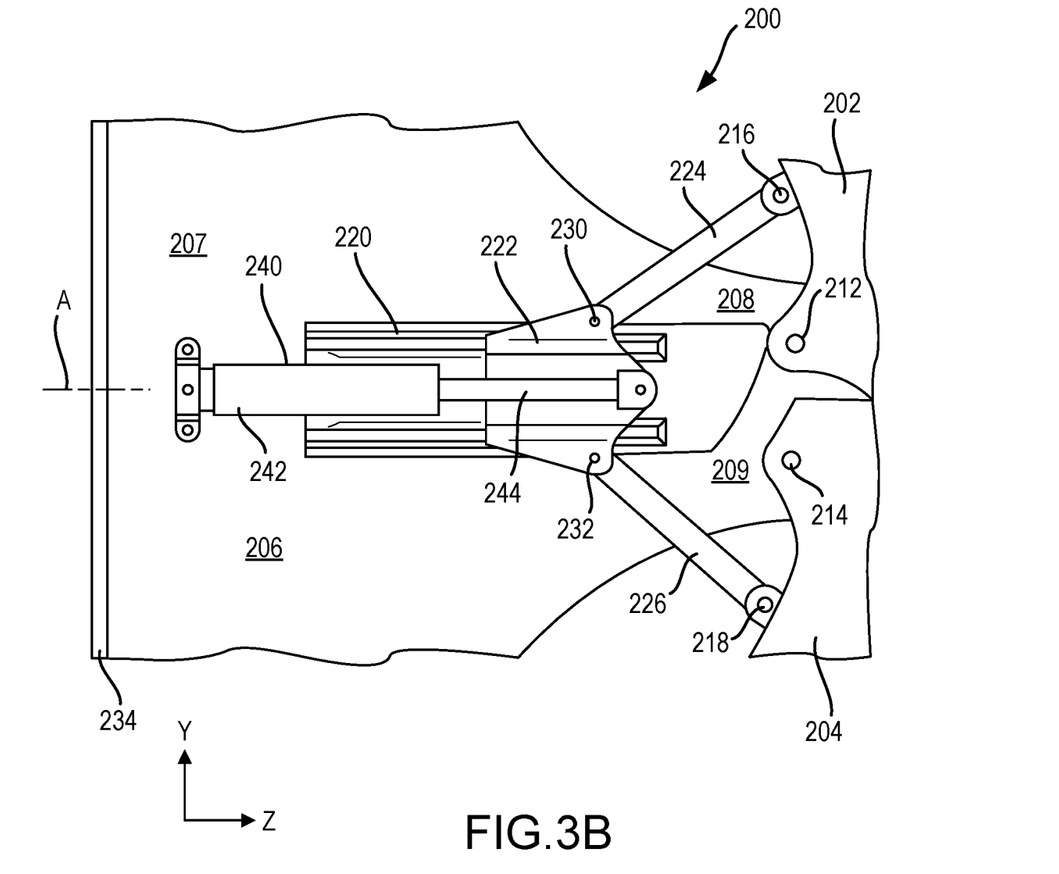

In response to carrier 222 translating in a first direction (e.g., in an aft direction (the positive Z-direction)) along track 220, a load (e.g., see load 250 of FIG. 3A) is transmitted between carrier 222 and upper reverser door 202, via first link 224, which urges upper reverser door 202 to rotate about hinge 212 towards an open position (see FIG. 3A and FIG. 3B). Similarly, in response to carrier 222 translating in the first direction along track 220, a load (e.g., see load 252 of FIG. 3A) is transmitted between carrier 222 and lower reverser door 204, via second link 226, which urges lower reverser door 204 to rotate about hinge 214 towards an open position (see FIG. 3A and FIG. 3B).

In response to carrier 222 translating in a second direction (e.g., in a forward direction (the negative Z-direction in FIG. 2B)) along track 220, a load (e.g., see load 250 of FIG. 3A) is transmitted between carrier 222 and upper reverser door 202, via first link 224, which urges upper reverser door 202 to rotate about hinge 212 towards a closed position, as illustrated in FIG. 2A and FIG. 2B. Similarly, in response to carrier 222 translating in the second direction along track 220, a load (e.g., see load 252 of FIG. 3A) is transmitted between carrier 222 and lower reverser door 204, via second link 226, which urges lower reverser door 204 to rotate about hinge 214 towards a closed position, as illustrated in FIG. 2A and FIG. 2B. In this regard, first link 224 and second link 226 may be configured to transmit tensile and compressive loads between upper reverser door 202 and carrier 222 and lower reverser door 204 and carrier 222, respectively.

With reference to FIGS. 2A, 2B, 3A, and 3B, in response to the thrust reverser 200 assuming the closed or stowed position, e.g., during flight, the upper reverser door 202 and the lower reverser door 204 are rotated to their closed positions (see FIG. 2A and FIG. 2B). The outer surfaces of the upper reverser door 202 and the lower reverser door 204 blend with the outer surface of the nacelle, forming a smooth aerodynamic shape of the gas turbine engine. In the same stowed configuration, a mixed gas stream 260 exits the exhaust duct 205 and is generally unaffected by the thrust reverser 200 or its componentry, as the inner surfaces of the upper reverser door 202 and the lower reverser door 204 are blended with the interior surface of the exhaust duct 205 to provide a generally smooth and annular exhaust flow path from downstream of the core engine exhaust to a downstream exit plane or aft end of the thrust reverser 200. While in the stowed position, the mixed gas stream 260 flows out the exhaust duct 205, providing forward thrust necessary to propel the aircraft. In response to the thrust reverser 200 assuming the open or deployed position, e.g., upon landing, the upper reverser door 202 and the lower reverser door 204 are rotated to their open positions (see FIG. 3A and FIG. 3B). The mixed gas stream 260 is diverted from the exit of the exhaust duct 205 to form a first stream 292, following an inner surface of the upper reverser door 202 and a second stream 294, following an inner surface of the lower reverser door 204. Both the first stream 292 and the second stream 294 have forward vector components of thrust, which provide the reverse thrust acting on the aircraft.

A central axis A is illustrated extending through the thrust reverser 200. The central axis A may define a fore end or fore direction (negative Z-direction) of the thrust reverser 200 and an aft end or aft direction (positive Z-direction) of the thrust reverser 200. Various embodiments of the disclosure may be described in relation to the central axis A. For example, the upper reverser door 202 may be considered positioned above the central axis A while the lower reverser door 204 may be considered positioned below the central axis A. Similarly, the port side beam 209 may be considered positioned to the port or left side of the central axis A (looking in the fore direction (negative Z-direction)) while the starboard side beam may be considered positioned to the right or starboard side of the central axis A (looking in the fore direction). More generally, reference to a first reverser door may broadly refer to a reverser door positioned opposite a second reverser door with respect to the central axis A, there being no preferred up or down or side to side orientation, while reference to a first side beam may broadly refer to a side beam positioned opposite a second side beam with respect to the central axis A. As used herein, a first component positioned opposite a second component does not imply the second component is a mirror image of the first component or the second component is positioned symmetrically opposite to the first component, though the disclosure contemplates such mirror image and symmetric configurations and positioning.

In various embodiments, hinge 216, hinge 218, hinge 230, and hinge 232 are floating hinges. As used herein, the term "floating hinge" may refer to an axis of rotation of a hinge, wherein the position of the axis of rotation with respect to frame 206 varies dependent upon the position of carrier 222 with respect to track 220, and consequently the rotational position of upper reverser door 202 and/or lower reverser door 204. In various embodiments, hinge 212 and hinge 214 are fixed hinges. As used herein, the term "fixed hinge" may refer to an axis of rotation of a hinge, wherein the position of the axis of rotation is fixed with respect to frame 206 regardless of (or independent of) the position of carrier 222 with respect to track 220, and consequently the rotational position of upper reverser door 202 and/or lower reverser door 204. Although it is contemplated herein that hinge 212 and hinge 214 may be floating hinges depending on the design of thrust reverser 200.

In various embodiments, carrier 222 may be driven along track 220 via a linear actuator 240. In this regard, linear actuator 240 may be coupled to carrier 222. Linear actuator 240 may comprise any suitable actuator for imparting linear motion to carrier 222, including a mechanical actuator, an electromechanical actuator, a pneumatic actuator, a hydraulic actuator, among others. Linear actuator 240 may be mounted to frame 206. In various embodiments, linear actuator 240 is coupled to frame 206. In various embodiments, linear actuator 240 is coupled to bulkhead 234. Linear actuator 240 may comprise a moveable member 244 which may extend from an actuator housing 242 to drive, or move, carrier 222 in said first direction along track 220. Conversely, moveable member 244 may retract or compress into actuator housing 242 to move carrier 222 in said second direction. However, it is contemplated herein that linear actuator 240 may extend or retract to move carrier 222 in said first direction or said second direction along track 220 depending on the location of linear actuator 240 with respect to carrier 222. In this regard, upper reverser door 202 and lower reverser door 204 may move between stowed and deployed positions in response to linear actuator 240 extending and/or retracting.

Figure 4:
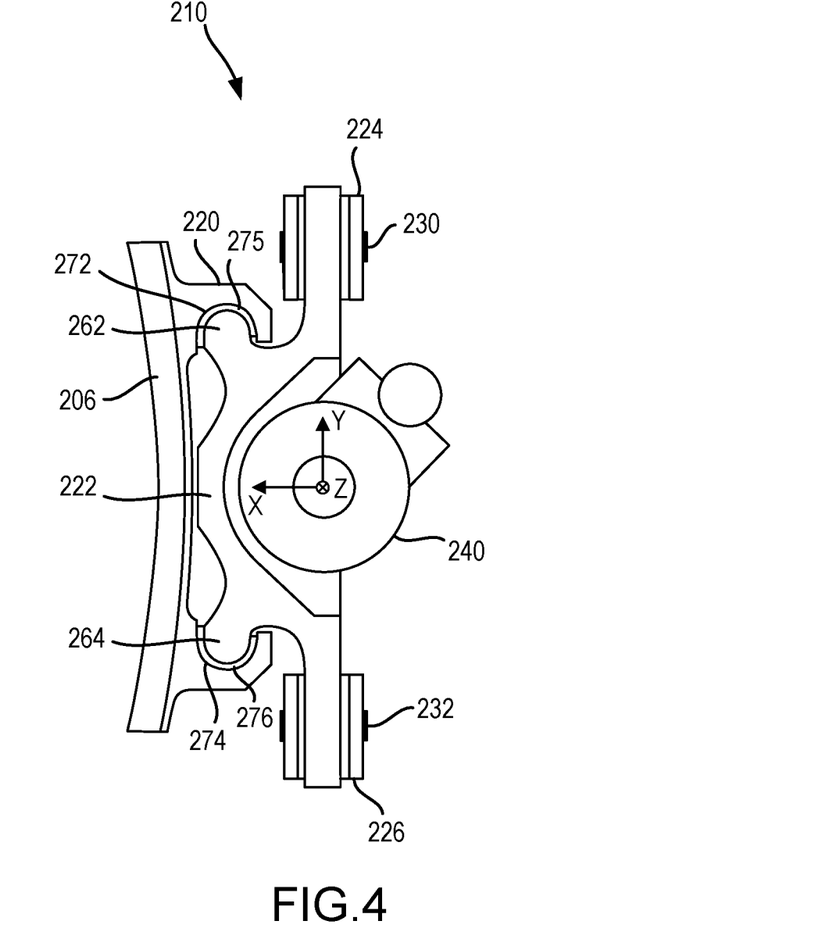
FIG. 4 provides a section view of an actuation arrangement, in accordance with various embodiments.

With reference to FIG. 4, a section view of actuation arrangement 210 is illustrated mounted to frame 206. Carrier 222 may comprise a first track lug 262 and a second track lug 264. Track 220 may comprise a first groove 272 and a second groove 274. First track lug 262 may be received by first groove 272 and second track lug 264 may be received by second groove 274. In this manner, the carrier 222 may be retained by the track 220. In various embodiments, track 220 is coupled to frame 206. In various embodiments, track 220 and frame 206 are formed as a monolithic structure.

Figure 6:
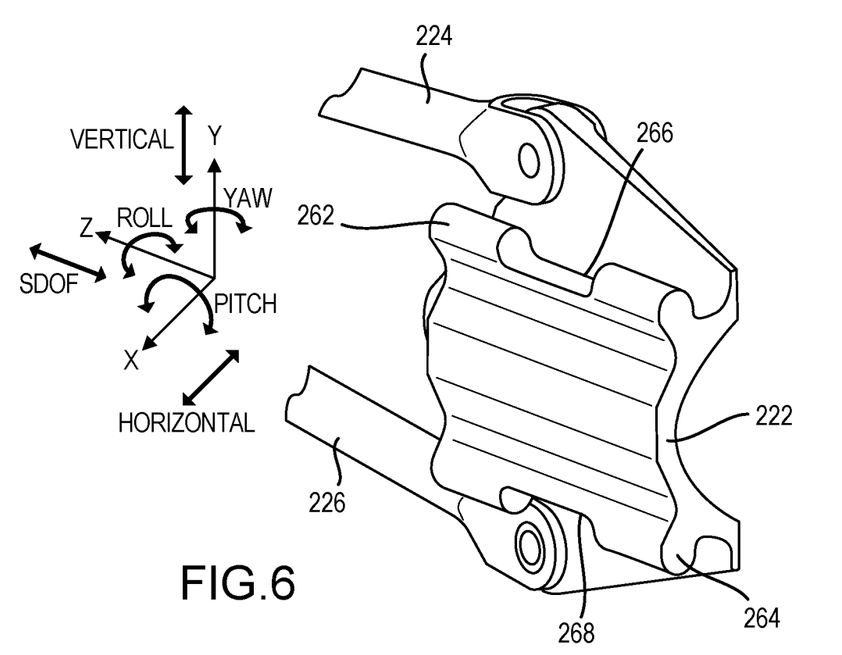
FIG. 6 provides an isometric view of a carrier coupled to a pair of links, in accordance with various embodiments.

In this manner, and with combined reference to FIG. 4 and FIG. 6, carrier 222 interacts with the track 220 and reacts loads corresponding to five degrees of freedom (vertical, horizontal, roll, pitch, and yaw) of carrier 222 with respect to track 220, thereby transferring loads associated with these degrees of freedom from carrier 222, into track 220, and into frame 206. As used herein, "vertical" may refer to movement of carrier 222 parallel the Y-axis (i.e., vertically) with respect to track 220. As used herein, "horizontal" may refer to movement of carrier 222 parallel the X-axis (i.e., horizontally) with respect to track 220. As used herein, "roll" may refer to rotation of carrier 222 about the Z-axis with respect to track 220. As used herein, "pitch" may refer to rotation of carrier 222 about the X-axis with respect to track 220. As used herein, "yaw" may refer to rotation of carrier 222 about the Y-axis with respect to track 220. In this regard, linear actuator 240 is left to react loads between frame 206 and carrier 222 only along a single direction (single degree of freedom). Namely, linear actuator 240 transfers loads between frame 206 and carrier 222 along a line-of-action of linear actuator 240. As used herein, the term "line-of-action" may refer to a direction, or axis, through a point at which a force is applied in the same direction as the vector of the force. In this regard, a line-of-action of an actuator may refer to a longitudinal axis of the actuator for a single degree of freedom actuator mechanism that transfers a force along the direction of its longitudinal axis. For example, said line-of-action of linear actuator 240 may be along the Z-axis illustrated in FIG. 4. It is contemplated herein that the linear actuator 240 may further incorporate spherical type bearings at each end to accommodate manufacturing tolerances, structural deflections, etc.

Figure 5:
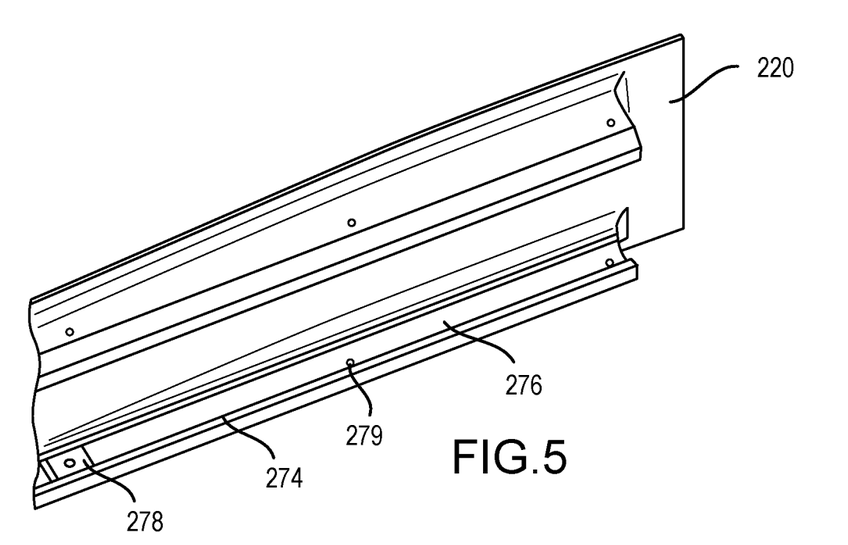
FIG. 5 provides an isometric view of a track, in accordance with various embodiments.

In various embodiments, a first liner 275 is disposed between first groove 272 and first track lug 262. In various embodiments, a second liner 276 is disposed between second groove 274 and second track lug 264. First track lug 262 may contact first liner 275. Second track lug 264 may contact second liner 276. First liner 275 and/or second liner 276 may comprise a metal material or a polymer material. First liner 275 and/or second liner 276 may reduce a coefficient of friction between first groove 272 and first track lug 262, and second groove 274 and second track lug 264, respectively. Furthermore, first liner 275 and/or second liner 276 may be configured as wear surfaces which may be replaced during maintenance. In various embodiments, first liner 275 and/or second liner 276 may be configured as wear surfaces comprising a hardness which is greater than track 220, thereby increasing the wear life of track 220. With additional reference to FIG. 5, a perspective view of track 220 is illustrated, in accordance with various embodiments. Second liner 276 may conform to the geometry of second groove 274 and may extend along second groove 274 to provide a continuous surface upon which second track lug 264 may ride. Second liner 276 may be retained to track 220 via an end block 278 and/or fasteners 279.

With reference to FIG. 6, first track lug 262 may comprise a cutout 266 configured to reduce the surface area of first track lug 262 in contact with track 220 (see FIG. 4), thereby minimizing friction between carrier 222 and track 220 and furthermore reducing overall weight of carrier 222. Likewise, second track lug 264 may comprise a cutout 268 configured to reduce the surface area of second track lug 264 in contact with track 220 (see FIG. 4), thereby minimizing friction between carrier 222 and track 220 and furthermore reducing overall weight of carrier 222.

Figure 7:
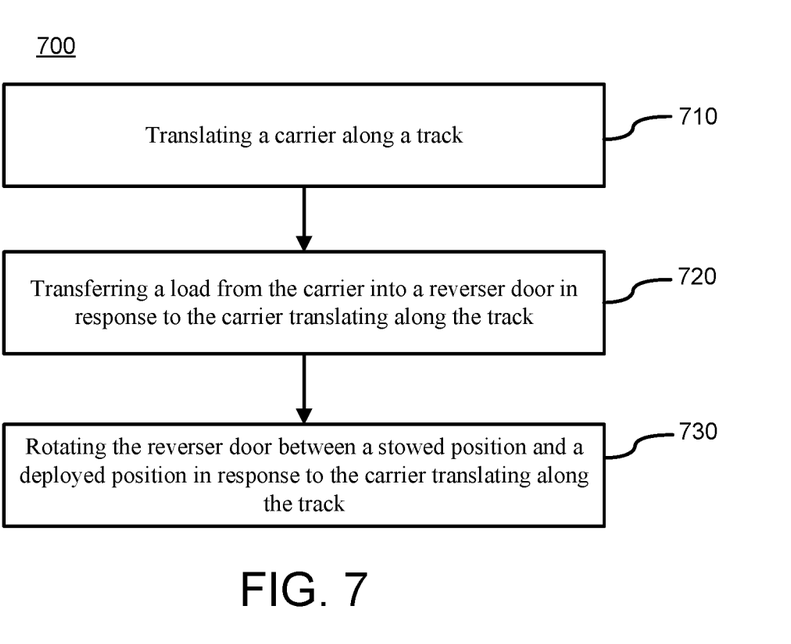
FIG. 7 provides a flow chart illustrating a method of deploying a thrust reverser, in accordance with various embodiments.

With reference to FIG. 7, a method 700 for deploying a thrust reverser is illustrated, in accordance with various embodiments. Method 700 includes translating a carrier along a track (step 710). Method 700 includes transferring a load between the carrier and a reverser door in response to the carrier translating along the track (step 720). Method 700 includes rotating the reverser door between a stowed position and a deployed position in response to the carrier translating along the track (step 730).

With combined reference to FIG. 3A and FIG. 7, step 710 may include translating carrier 222 along track 220. Step 710 may include translating carrier 222 aft (positive Z-direction) along track 220. In various embodiments, carrier 222 is driven along track 220 via linear actuator 240. Step 720 may include transferring a first load, represented by arrows 250, between the carrier 222 and upper reverser door 202 in response to the carrier 222 being driven along the track 220. First load 250 may be transferred between carrier 222 and upper reverser door 202 via first link 224. Step 720 may include transferring a second load, represented by arrows 252, between the carrier 222 and lower reverser door 204 in response to the carrier 222 translating along the track 220. Second load 252 may be transferred between carrier 222 and upper reverser door 202 via second link 226. Step 730 may include rotating the upper reverser door 202 between a stowed position (see FIG. 2A) and a deployed position (see FIG. 3A) in response to carrier 222 translating along track 220. Step 730 may include rotating the lower reverser door 204 between a stowed position (see FIG. 2A) and a deployed position (see FIG. 3A) in response to carrier 222 translating along track 220. Upper reverser door 202 and lower reverser door 204 may be simultaneously rotated between the stowed position and the deployed position in response to carrier 222 translating along track 220.

Figure 8:
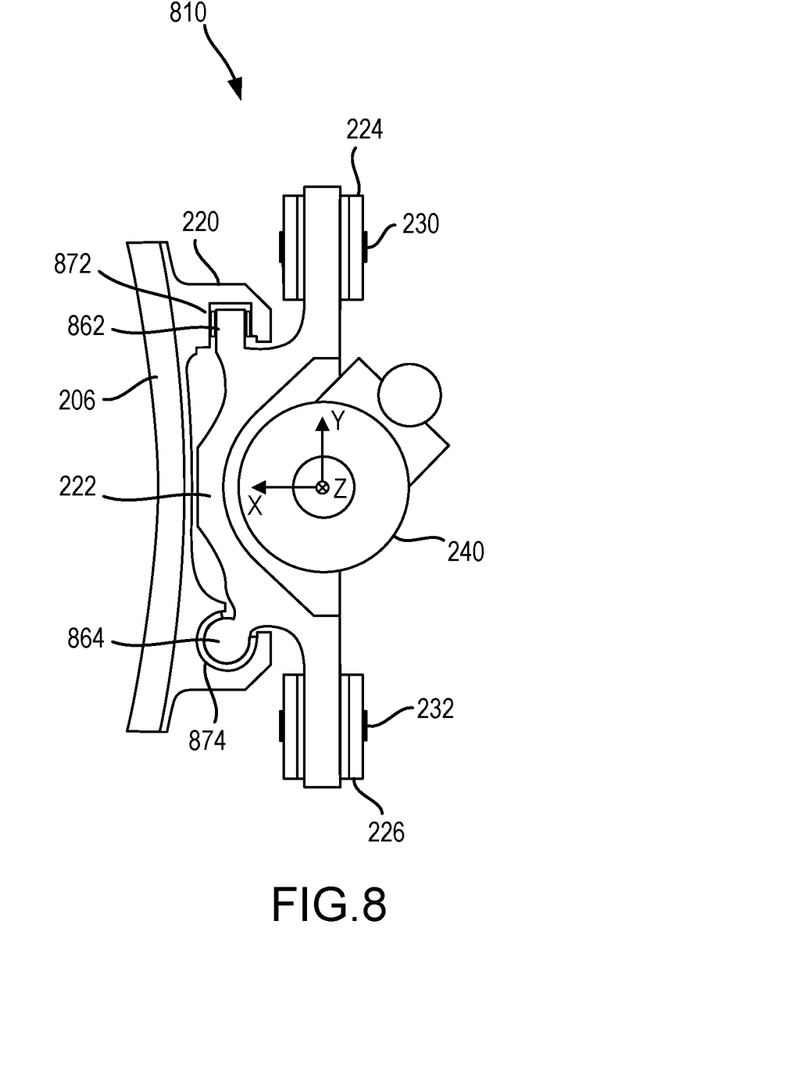
FIG. 8 provides a section view of an actuation arrangement, in accordance with various embodiments.

With reference to FIG. 8, a section view of actuation arrangement 810 is illustrated mounted to frame 206. Actuation arrangement 810 may be similar to actuation arrangement 210, except that the first track lug 862 may be configured to react loads between carrier 222 and track 220 only along a single direction (the X-direction in FIG. 8) and the second track lug 864 is configured to react loads between carrier 222 and track 220 in every direction except for the forward-aft direction (the Z-direction in FIG. 8). With respect to FIG. 8, elements with like element numbering, as depicted in FIG. 4, are intended to be the same and will not necessarily be repeated for the sake of clarity.

Carrier 222 may comprise a first track lug 862 and a second track lug 864. Track 220 may comprise a first groove 872 and a second groove 874. First track lug 862 may be received by first groove 872 and second track lug 864 may be received by second groove 874. In this manner, the carrier 222 may be retained by the track 220. First groove 872 may be formed as a rectangular slot. First track lug 862 may be formed as a rectangular lug. In this manner, first track lug 862 may be configured to carry only inboard and outboard loads (i.e., along the X-direction). Second groove 874 may be formed as a round slot. Second track lug 864 may be formed as a round, or partially round, lug. In this manner, second track lug 864 may be configured to carry inboard and outboard loads (i.e., along the X-direction) as well as tangential loads (i.e., along the Y-direction).

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. An actuation arrangement for a thrust reverser, comprising:
   a carrier configured to translate along a track disposed on a frame of the thrust reverser wherein the track comprises a first groove and a second groove;
   a linear actuator configured to be coupled to the frame, the linear actuator comprises an actuator housing and a moveable member, the moveable member configured to extend across the carrier, and the carrier comprising an actuator groove at least partially through which the moveable member extends;
   a first link configured to be pivotally coupled to the carrier, wherein the carrier is configured to move a first reverser door between a first stowed position and a first deployed position via the first link; and
   a second link configured to be pivotally coupled to the carrier, wherein the carrier is configured to move a second reverser door between a second stowed position and a second deployed position via the second link;
   wherein the carrier is configured to move the first reverser door between the first stowed position and the first deployed position in response to the carrier translating along the track; and
   the first link and the second link are disposed in a first plane, and the first groove and the second groove are in a second plane, the first plane spaced apart from the second plane.

2. The actuation arrangement of claim 1, wherein the carrier is driven by the linear actuator.

3. The actuation arrangement of claim 2, wherein the carrier is configured to react loads that are parallel to a line-of-action of the linear actuator from the first link into the linear actuator and configured to react loads that are non-parallel to the line-of-action of the linear actuator from the first link into the track.

4. The actuation arrangement of claim 1, wherein the carrier comprises a first track lug and the first groove is configured to receive the first track lug.

5. The actuation arrangement of claim 4, wherein the carrier comprises a second track lug and the second groove is configured to receive the second track lug, wherein the first track lug comprises a rectangular geometry and the second track lug comprises a round geometry.

6. The actuation arrangement of claim 5, further comprising a liner disposed in the first groove, wherein the first track lug is configured to contact a wear surface of the liner.

7. The actuation arrangement of claim 4, wherein the first track lug comprises a cutout configured to reduce a surface area of the first track lug in contact with the track.

8. The actuation arrangement of claim 1, wherein the frame comprises an annular structure.

9. The actuation arrangement of claim 8, wherein the first groove is circumferentially displaced from the second groove with respect to the annular structure.

10. The actuation arrangement of claim 1, wherein the moveable member is disposed in the first plane.

* * * * *